Figure 1:
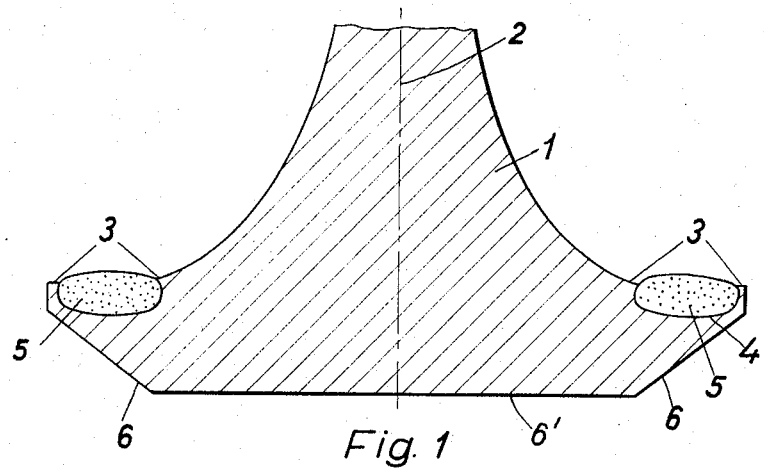

Jan. 9, 1968  G. KUBERA ET AL  3,362,057

METHOD OF MAKING VALVE BODIES

Filed June 7, 1965

Gerhard Kubera
Rolf Milbach
Inventors.

Ross & Mestern

United States Patent Office 3,362,057
Patented Jan. 9, 1968

3,362,057
METHOD OF MAKING VALVE BODIES
Gerhard Kubera and Rolf Milbach, Barsinghausen, Germany, assignors to Teves-Thompson & Co. G.m.b.H., Frankfurt am Main, Germany, a corporation of Germany
Filed June 7, 1965, Ser. No. 461,727
Claims priority, application Germany, June 13, 1964, T 26,375
8 Claims. (Cl. 29—156.7)

Our present invention relates to a method of and a blank for the production of valve bodies for use in internal-combustion engines and other apparatus characterized by high corrosivity, extreme temperature conditions and a tendency toward considerable wear of the valve members.

The valve bodies of internal-combustion engines and the like are subjected to elevated temperatures and corrosive action by both the exhaust gases and the combustion gases of such engines. For this reason, the valve bodies have been provided heretofore with corrosion- and wear-resistant valves either by a special treatment (e.g. working, annealing or hardening) of the seating surface of the valve or by a so-called "armoring" or "cladding" of the seat-forming portion with heat-, wear- and corrosion-resistant materials (e.g. high-temperature alloys). Thus, it is known to armor or clad the frustoconical seat-forming portion of a poppet valve, the latter being generally of "mushroom" or "tulip" configuration, with a wear- and corrosion-resistant alloy by depositing the alloy upon the valve seat surface and thereafter fusing it to the valve body by autogenous (oxyacetylene) or inductive smelting. It has also been proposed to weld preformed rings of the corrosion-resistant metal to the valve body by resistance welding or other fusion techniques; this method has involved various problems as practiced heretofore, mainly because of the configuration of the flange of the poppet valve. Thus this flange generally extends transversely to the axis or stem of the poppet valve and has a peripheral surface inclined toward the axis which must be provided with the cladding or armoring material. When the latter is to be deposited in a liquid stage, i.e. with autogenous gas-flame or inductive bonding, the liquid metal has the tendency to run or flow from the surface upon which its deposition is most desirable. To avoid this problem, it has been proposed heretofore to provide a refractory form designed to retain the liquid metal in place on the valve body until bonding to the latter is completed. Such refractory forms are relatively expensive and prone to deterioration; on the other hand, methods involving the application of preformed members (i.e. rings, or the like) of corrosion-resistant material to the valve body have been unsatisfactory because of the need to apply considerable pressures during the bonding process. Such pressures have a tendency to squeeze and deform the ring or the valve body. It is thus with considerable difficulty that metal-clad valve seats have been provided heretofore upon the usual poppet-type valves.

It is an important object of the present invention to provide an improved method of cladding poppet-type valves for internal-combustion engines and the like with wear- and corrosion-resistant layers.

Another object of the present invention is to provide an improved process for the production of valve bodies for internal-combustion engines and the like which permits the serial or mass production of such valve bodies with wear- and corrosion-resistant portions.

Still another object of our invention is to provide a blank which can be used for the convenient and efficient production of corrosion-resistant bodies.

An additional object of our invention is to provide an improved valve for internal-combustion engines and the like having wear- and corrosion-resisting seating surfaces.

These objects and others which will become apparent hereinafter are attained, in accordance with the present invention, by a method of producing a valve body for internal-combustion engines which comprises the steps of forming a valve blank with a stem and head, the latter in the form of an annular flange extending transversely to the axis of the stem, and depositing along an annular face of this flange and bonding thereto a wear- and/or corrosion-resistant material while the axis of the flange is held generally upright with this face substantially in a horizontal plane; after the hardening of the liquid-deposited, cast or smelted-in-place armoring layer, the head is plastically deformed so that the depositing face is inclined to the axis of the stem to yield a generally frustoconical seat engageable with the cylinder block of the engine. Prior to and concurrently with the final deformation of the surface bearing the deposit, the seat can be machined (e.g. by hot forging) to its final configuration; other machining, can, of course, also be carried out subsequently to the deformation of the head.

The present invention is advantageous at least in part in that it permits the deposition of a liquid bead or band of a high-temperature alloy which cannot be readily bonded by any other means to the base metal. The use of a retaining member or form for the liquid mass can be avoided if, according to another feature, of the present invention the bead-receiving generally horizontal face is channeled, fluted, grooved or otherwise formed with a shallow annular recess or depression in which the liquid deposit can be retained. It is thus no longer necessary to cast the alloy upon a partially cylindrical and partially inclined surface or to hard-face the latter directly, and a flowing of the deposited metal from these surfaces is avoided. The aforedescribed difficulties involved in the use of preformed rings are also eliminated. According to an important object of the present invention, when it is desired to produce a head which widens frustoconically away from the foot of the stem and has a frustoconical surface formed with the wear-resistant alloy, one head of the blank is initially tapered outwardly toward the foot with a frustoconical surface adjoining the crown of the head, this surface being flattened upon deformation of the head, subsequently to deposition of the alloy, to the final shape of the valve.

In this manner, the flanged periphery of the head can be forced axially toward the crown without any significant change in the volume of the head in a manner akin to the bending of a projection. While reference has been made again to castable means, it has been understood that the reinforcing alloy need not be actually poured into the annular channel but may be deposited upon the upwardly facing and generally horizontal surface in a form of a wire ring, a cast or sintered-powder annulus, as loose powder or as a pressed-powder ring. The alloying material is rendered integral with the valve body by autogenous, inductive or other heating to the point at which the alloy commences to flow and bonds to the valve body.

Figure 2:
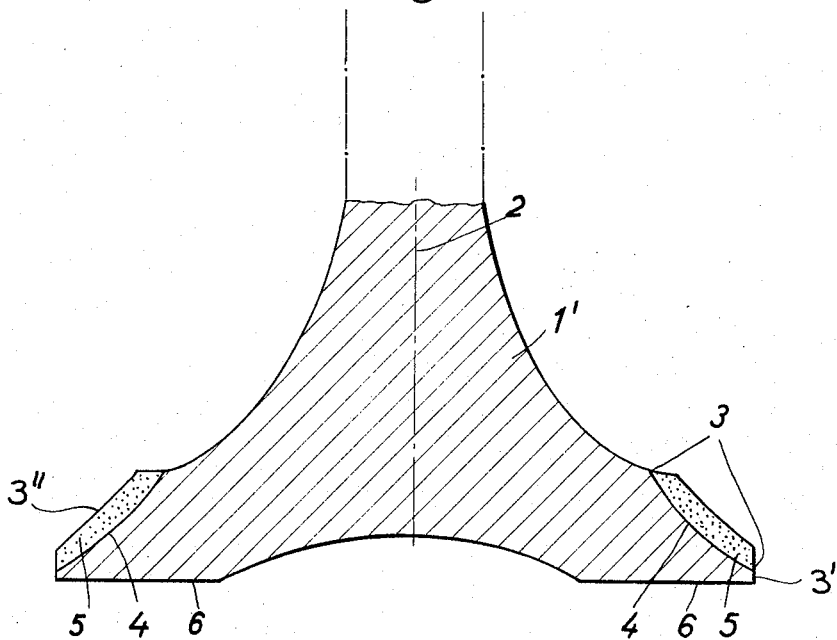

The above and other objects of the present invention will become more readily apparent from the following description, reference being made to the accompanying drawing in which:

FIG. 1 is an axial cross-sectional view of the head of a valve blank, according to this invention, for deposition of a bead of wear-resistant alloy; and FIG. 2 is a view similar to FIG. 1, showing the valve head after deformation to its finished form.

In FIGS. 1 and 2 we show a poppet-valve blank of the "tulip" type which is formed from a blank 1 whose head is seen in FIG. 1, the shank or stem being designated by dot-dash lines. The head of the blank symmetrically surrounds the axis 2 of the valve body and comprises an annular receiving face 3 extending perpendicularly to the axis 2 and lying generally in a horizontal plane for the initial steps of the process. When the head 1 is formed transversely to the stem it is provided with an annular upwardly concave channel 4 in which the wear-resistant material 5 is deposited by liquid casting or in a solid state for subsequent melting. The crown of the blank 1 tapers outwardly toward the foot of the stem and thus has a frustoconical annular surface 6 which is a continuation of the crown 6' of the blank.

After smelting of the alloying material 5, the flanged head 1 is deformed toward the crown as indicated at 1' in FIG. 2, whereupon surface 6 lies substantially in a plane perpendicular to the axis 2, while face 3 at least in part has a frustoconical configuration, the portion 3' thereof being substantially cylindrical. The deformation is effected by a bending without substantial alteration of the volume of the head to impart a partially frustoconical 3" and a partially cylindrical 3' configuration to the formerly horizontal surface 3 (FIG. 1). The heating of the head to effect bonding can be sufficient to raise the temperature thereof to that required for hot forging.

*Example*

A blank having the configuration of FIG. 1 is produced by conventional shaping from a suitably dimensioned slug for an austenitic nickel-chromium steel of the following composition:

| | Weight percent |
|---|---|
| Carbon | 0.2–0.4 |
| Nickel | 7–9 |
| Chromium | 11.5–14 |
| Silicon | <0.65 |
| Manganese | 0.4 |
| Molybdenum | 0.45–0.95 |
| Cobalt | 2.5–3.5 | the balance being iron. The valve seat had a width between substantially 2.5 mm. and 1 cm. in several tests, with the width of the ribbon of alloying material 5 being selected accordingly. The alloying material was a high-temperature, wear-resistant material consisting essentially of:

| | Weight percent |
|---|---|
| Carbon | 3 |
| Chromium | 28 |
| Tungsten | 18 |
| Cobalt | 35 |
| Iron | 9 |
| Vanadium | 4 |
| Boron | 0.1 |
| Nickel | 3 |

The alloy was deposited as a powder in the recess 4 and melted with an oxy-acetylene torch to bond the alloying material to the valve body. Thereafter the heated head was deformed to the shape shown in FIG. 2 by hot forging.

We claim:

1. A method of making a poppet-type valve for internal-combustion engines and the like, said method comprising the steps of:
   (a) forming a blank having an axially extending stem, and a head at one end of said stem provided with an annular surface lying generally in a plane perpendicular to the axis of the blank;
   (b) depositing an annular band of an armoring material along said surface while holding said blank with the axis thereof in a substantially upright position and bonding said material to said blank along said surface; and
   (c) thereafter bending an annular portion of said head provided with said band out of said plane and away from said stem to produce a seat-forming portion of said head at least in part with generally frustoconical configuration.

2. The method defined in claim 1 wherein said band of armoring material is bonded to said blank by heating it in step (b) to a temperature at least sufficient to liquify the armoring material.

3. The method defined in claim 2 wherein at least said annular portion of said head is heated to hot-forging temperature prior to the bending thereof in step (c) to produce said seat-forming portion.

4. The method defined in claim 2 wherein said surface is provided with an annular channel opening upwardly while said blank is held with its axis in said upright position in step (b), said armoring material being deposited within said channel and forming a liquid bead therein prior to hardening.

5. The method defined in claim 4 wherein said armoring material is inserted in said channel in step (b) as a coherent ring, said ring being smelted to bond said material to said blank.

6. The method defined in claim 4 wherein said armoring material is disposed in said channel in step (b) as a powder and flows together to form said bead upon smelting.

7. The method defined in claim 1 wherein the head of said blank has a crown and said annular portion of said head tapers outwardly away from said crown prior to the bending of said annular portion, said annular portion being bent in step (c) substantially into coplanarity with said crown.

8. A method of producing a seat-forming portion on the head of a valve blank having an annular flange portion provided with an annular surface lying substantially in a plane perpendicular to the axis of the valve blank, said method comprising the steps of holding said valve blank with the axis thereof in a substantially upright position and said plane in a substantially horizontal position; deposing an annular band of a wear- and corrosion-resistant material along the surface and bonding said material to said blank by smelting said material; and thereafter bending said annular portion out of said plane perpendicular to the axis of said blank.

References Cited

UNITED STATES PATENTS

| 1,709,606 | 4/1929 | Catland. | |
| 1,959,068 | 5/1934 | Stoll | 29—156.7 |
| 2,136,690 | 11/1938 | Jardine. | |
| 2,435,948 | 2/1948 | Wischhusen | 29—156.7 |
| 2,987,805 | 6/1961 | Kubera et al. | 29—156.7 |
| 3,218,705 | 11/1965 | Shirtum | 29—528 |
| 3,264,717 | 8/1966 | Class et al. | 29—528 X |
| 3,319,321 | 5/1967 | Danis | 29—156.7 |

CHARLIE T. MOON, *Primary Examiner.*

PAUL COHEN, *Assistant Examiner.*